(12) United States Patent
Mueller et al.

(10) Patent No.: US 11,225,033 B2
(45) Date of Patent: Jan. 18, 2022

(54) ULTRASONIC WELDING DEVICE

(71) Applicant: SCHUNK SONOSYSTEMS GMBH, Wettenberg (DE)

(72) Inventors: Stefan Mueller, Wetzlar (DE); Rainer Wagenbach, Merenberg (DE); Waldemar Werner, Reiskirchen (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 92 days.

(21) Appl. No.: 16/641,856

(22) PCT Filed: Aug. 14, 2018

(86) PCT No.: PCT/EP2018/072049
§ 371 (c)(1),
(2) Date: Feb. 25, 2020

(87) PCT Pub. No.: WO2019/042765
PCT Pub. Date: Mar. 7, 2019

(65) Prior Publication Data
US 2021/0154948 A1    May 27, 2021

(30) Foreign Application Priority Data
Sep. 4, 2017   (DE) .................... 10 2017 215 483.7

(51) Int. Cl.
*B32B 37/00*     (2006.01)
*B29C 65/00*     (2006.01)
(Continued)

(52) U.S. Cl.
CPC .......... *B29C 66/8167* (2013.01); *B23K 20/10* (2013.01); *B29C 65/08* (2013.01); *B29C 66/81264* (2013.01); *B29C 66/81265* (2013.01)

(58) Field of Classification Search
USPC ...................................... 156/580.1
See application file for complete search history.

(56) References Cited

U.S. PATENT DOCUMENTS 4,410,383 A    10/1983 Lipari
5,368,464 A    11/1994 Stewart et al.
(Continued)

FOREIGN PATENT DOCUMENTS

| CN | 1490906 A | 2/2004 |
| CN | 1676266 A | 10/2005 |
(Continued)

OTHER PUBLICATIONS

Zhao; Foundation of Mechanical Manufacturing; pp. 159-163; 2017.
(Continued)

*Primary Examiner* — James D Sells
(74) *Attorney, Agent, or Firm* — Dickinson Wright PLLC; Andrew D. Dorisio

(57) ABSTRACT

The invention relates to an ultrasonic welding device comprising a sonotrode (14) transmitting ultrasonic vibrations and an anvil (15) disposed on an anvil carrier (17), the anvil (15) being disposed on the anvil carrier (17) in an exchangeable manner so that an mounting surface (21) of the anvil (15) rests against a support surface (22) of the anvil carrier (17) by means of a normal force exerted by a pretensioning device, the mounting surface (21) of the anvil (15) having a surface hardness greater than the surface hardness of the support surface (22) of the anvil carrier (17), the mounting surface (21) having a surface structure at least in the area of a partial surface, and the mounting surface (21) having a surface roughness of $R_z/R_a \geq 2$ at least in the area of the partial surface.

10 Claims, 3 Drawing Sheets

(51) Int. Cl.
*B23K 20/10* (2006.01)
*B29C 65/08* (2006.01)

(56) References Cited

U.S. PATENT DOCUMENTS

2020/0269347 A1* 8/2020 Mueller ................ B23K 20/10
2020/0338663 A1* 10/2020 Mueller ............... B23K 20/106

FOREIGN PATENT DOCUMENTS

| CN | 1814388 A | 8/2006 |
| CN | 101778690 A | 10/2017 |
| DE | 10330431 | 1/2005 |
| DE | 202011005326 U1 | 9/2011 |

OTHER PUBLICATIONS

J-P Masson: "Rauheitsvergleich von Oberflichen"; Mar. 1, 2014; XP055210701; http://zimob.de/wp-content/uploads/2014/04/Rauheitsvergleich-A3.pdf.

* cited by examiner

ULTRASONIC WELDING DEVICE

FIELD OF THE INVENTION

The invention relates to an ultrasonic welding device comprising a sonotrode transmitting ultrasonic vibrations and an anvil disposed on an anvil carrier, the anvil being disposed on the anvil carrier in an exchangeable manner so that an mounting surface of the anvil rests against a support surface of the anvil carrier by means of a normal force exerted by a pretensioning device.

BACKGROUND OF THE INVENTION

From product brochure "STAPLA Ultraschall-Schweiß-systeme KOBRA" [English: "STAPLA Ultrasonic Welding Systems KOBRA"] by Schunk Sonosystems GmbH published August 2007, an ultrasonic welding device of the make mentioned above is known. The familiar ultrasonic welding device realized as a pair of welding tongs comprises an anvil which is disposed on an anvil carrier in an exchangeable manner and is held in position in a connection plane between an mounting surface of the anvil and a support surface of the anvil carrier by means of a screw connection, which generates a pretensioning force acting as a normal force between the support surface of the anvil carrier and the mounting surface of the anvil, in order to prevent longitudinal vibrations of the sonotrode, which are transmitted to the support surface of the anvil carrier via the mounting surface of the anvil, from causing relative movements between the anvil and the anvil carrier. If such relative movements were to occur, they could otherwise lead to local welds between the anvil and the anvil carrier in the connection plane, which would preclude being able to separate the anvil from the anvil carrier when the anvil needs to be exchanged.

It has emerged in practice that when the anvil is miniaturized and the screw connection between the anvil and the anvil carrier is correspondingly small, it is not possible to generate a sufficiently large pretensioning force between the anvil and the anvil carrier in order to ensure suppressing the undesirable relative movement between the anvil and the anvil carrier.

SUMMARY OF THE INVENTION

The object of the invention at hand is therefore to propose an ultrasonic welding device which enables effectively holding the anvil in place on the anvil carrier even when the normal forces are comparatively small.

In order to attain this object, the ultrasonic welding device according to the invention has the features of claim 1.

According to the invention, the mounting surface of the anvil has a surface hardness greater than the surface hardness of the support surface of the anvil carrier, the mounting surface having a surface structure at least in the area of a partial surface, and the mounting surface having a surface roughness of $R_z/R_a \geq 2$ at least in the area of the partial surface.

The differently realized surface hardness of an mounting surface of the anvil realized harder in comparison to the support surface of the anvil carrier enables a surface structure realized at least in a partial surface of the mounting surface to leave an imprint in the support surface by means of the acting normal force if the mounting surface has a surface roughness of $R_z/R_a \geq 2$ at least in the area of the partial surface.

With this ratio of the surface roughness, the average roughness $R_a$ is surpassed sufficiently by the average maximum height of the profile $R_z$ in order for the surface structure to effectively impede relative movement in the direction of the longitudinal vibrations of the sonotrode.

The consideration that a fixation—i.e., axially holding the anvil in place with respect to the anvil carrier—is achieved generally provides the basis of thought when a surface structure forms a barrier for a relative movement in the longitudinal direction of vibration of the sonotrode at least in the area of a partial surface.

If, according to a preferred embodiment, the surface structure comprises a linear structure component inclined at an angle of attack $\alpha$ with respect to the longitudinal direction of vibration of the sonotrode in at least sections, a single linear structure comprising a structure component inclined at an angle $\alpha$ toward the longitudinal direction of vibration of the sonotrode as a line section can already be sufficient, for example. The line structure can either be straight or sinuous.

Preferably, the support surface of the anvil carrier has a surface hardness less than 58 HRC and the mounting surface of the anvil has a surface hardness greater than 59 HRC.

Even though a linear structure component already causes a positive effect which enables effectively counteracting a relative movement even when the normal force is reduced and which serves for generally impeding relative movement by hindering a relative movement in the direction of the longitudinal vibrations of the sonotrode, it has proven to be particularly advantageous if the surface structure is formed by a line grid, the grid preferably having raised grid lines of a height determined by $R_z$.

A replicable embodiment of the line grid becomes possible if the grid is produced by means of subjecting at least a partial surface of the mounting surface to laser beams, an mounting surface of the anvil, which was processed by milling, being able to be scanned with a laser beam in paths disposed parallel to one another for producing the grid lines.

As a result, values for the surface roughness $R_z=25$ μm, i.e., according to a milling of the mounting surface, and $R_a=5$ μm, i.e., according to a subjection of the mounting surface to laser beams, are possible, for example.

An advantageous embodiment can already be attained if the mounting surface has a surface roughness of $R_z/R_a \geq 5$ at least in the area of the partial surface.

It has been proven in tests that further improvements are possible if $R_z \geq 8$ μm, and even more improvements are possible if $R_z \geq 20$ μm.

With a surface roughness of $R_z \geq 25$ μm, which is possible by milling the mounting surface as mentioned above in an exemplary manner, the subjection of the mounting surface to laser beams for realizing a grid-shaped surface structure can be used particularly advantageously for attaining the desired ratio of $R_a/R_z$.

BRIEF DESCRIPTION OF THE DRAWING FIGURES

In the following a preferred embodiment of the invention is further described by means of the drawing.

DETAILED DESCRIPTION OF THE INVENTION

Figure 1:
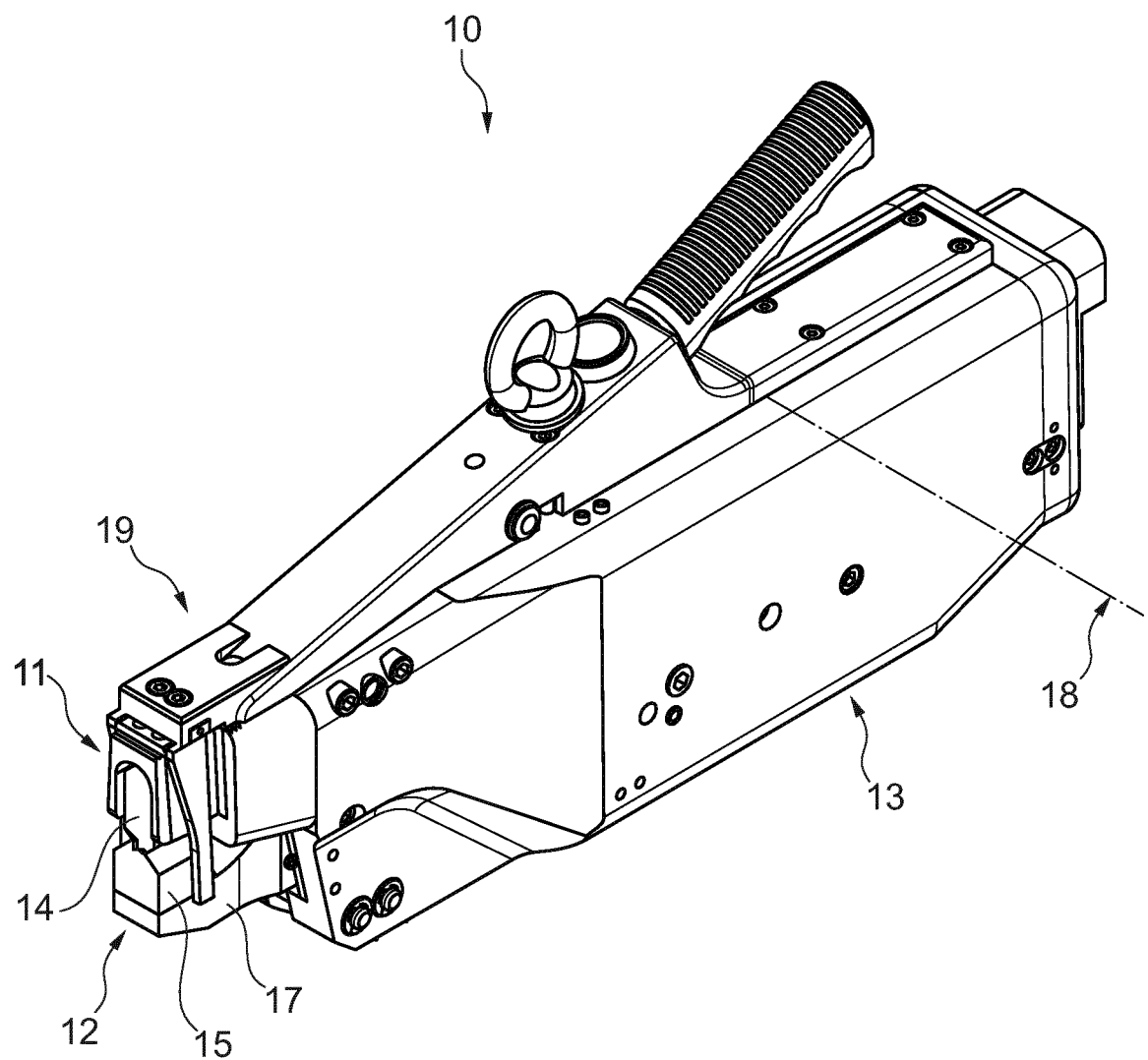
FIG. 1 shows an isometric view of an ultrasonic welding device realized as a pair of welding tongs and having welding jaws disposed in a tong casing and in closed position.

FIG. 1 shows in an isometric view an ultrasonic welding device 10 realized as a pair of ultrasonic welding tongs and having an upper tong part 11 and a lower tong part 12 which are disposed in a shared tong casing 13. As an essential component, upper tong part 11 comprises an ultrasonic vibration device comprising a sonotrode 14 which is disposed on a front end of the ultrasonic vibration device and forms a first welding jaw. On welding casing 13, an anvil 15 is disposed which is held displaceably vis-à-vis sonotrode 14 and is connected to an anvil carrier 17 in an exchangeable manner by means of a pretensioning device realized as screw connection 16 (FIG. 2) in this instance.

Anvil 15 forms a second welding jaw which can be pivoted against sonotrode 14 around a pivot axis 18 formed in the back part of tong casing 13 by means of an actuating device (not shown) in such a manner that an opposing surface 19 formed on anvil 15 is moved against a work surface 20 of sonotrode 14 realized in this instance as emitting longitudinal vibrations.

Figure 2:
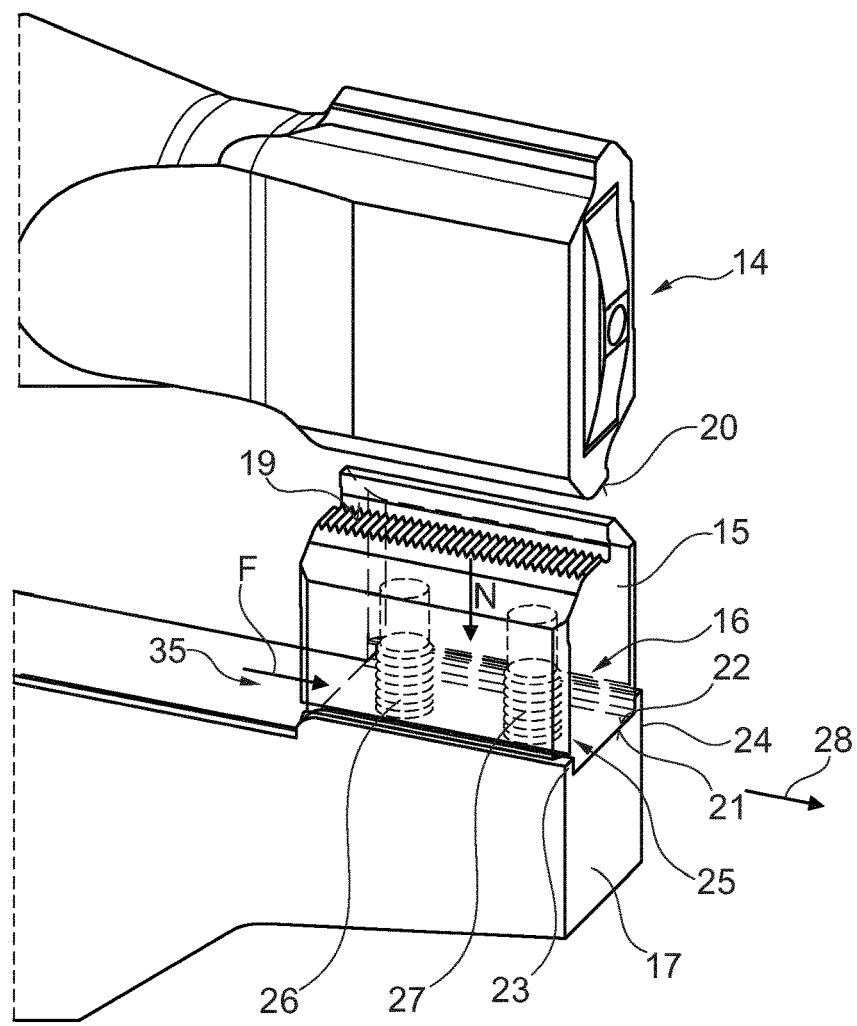
FIG. 2 shows a view of the open welding jaws of the pair of welding tongs shown in FIG. 1 and having an anvil disposed on an anvil carrier.

As becomes clear in the view of FIG. 2, anvil 15 is connected in such a manner to anvil carrier 17 via screw connection 16 that an mounting surface 21 (cf. FIG. 3) forming the lower sider of anvil 15 rests on a support surface 22 forming the upper side of anvil carrier 17. In the present instance, anvil carrier 17 is provided with guiding projections 23, 24 along its longitudinal edges, guiding projections 23, 24 forming an axial guiding device 25 such that in order to exchange anvil 15, anvil 15 can be removed in longitudinal direction 28 of sonotrode 14 after loosening screw connection 16, screw connection 16 in the present instance comprising two bolt connections 26, 27, and longitudinal direction 28 in the present instance coinciding with the main vibration direction of sonotrode 14.

As can be seen in FIG. 2, screw connection 16 serves for generating a clamping or normal force N by means of which mounting surface 21 is pressed against support surface 22 for holding anvil 15 in place in longitudinal direction 28.

Figure 3:
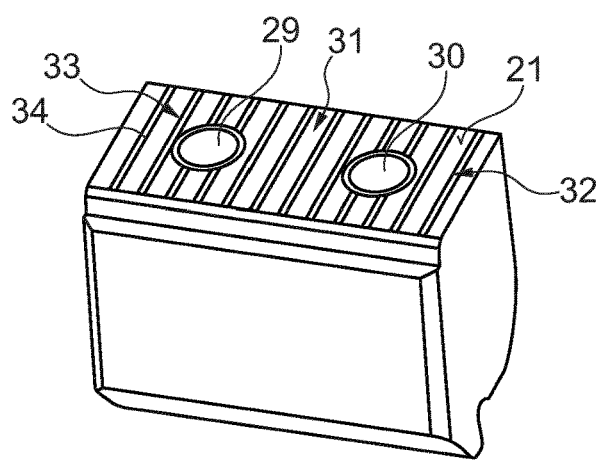
FIG. 3 shows the anvil shown in FIG. 2 in a bottom view including a schematic view of a surface structure realized in an mounting surface of the anvil.

As FIG. 3 shows, mounting surface 21 of the anvil in which surface two threaded bores 29, 30 are provided in the present embodiment for realizing bolt connections 26, 27 is provided with a surface structure 32 in the area of a partial surface 31, surface structure 32 being only schematically shown in the present instance and comprising a plurality of structure components 33 realized as structure lines in the present instance. Structure components 33 form raised grid lines 34 in mounting surface 21 at least partially or in sections, grid lines 34 being oriented against support surface 22 in the assembled state of anvil 15 shown in FIG. 2 and being inclined at an angle of attack α=90° toward the longitudinal direction in the shown exemplary embodiment.

Anvil 15 and anvil carrier 17 are made of different materials in the present instance so anvil 15 and anvil carrier 17 have a differing surface hardness at least in the area of mounting surface 21 and support surface 22, which is 62 HRC for the anvil and 57 HRC for anvil carrier 17 in the present instance.

Owing to raised grid lines 34 being formed on mounting surface 21 of anvil 15 and to mounting surface 21 of anvil 15 being harder in comparison to support surface 22 of anvil carrier 17, grid lines 34 of abutment surface 21 are embossed in support surface 22 of anvil carrier 17 so that a form-fit connection is realized in a connection plane 35 between anvil 15 and anvil carrier 17 when a sufficiently large normal force N is being exerted, the form-fit connection causing anvil 15 to lock on anvil carrier 17 in longitudinal direction 28 with the result that longitudinal vibrations transmitted to anvil 15 via sonotrode 14 cannot cause relative movements between anvil 15 and anvil carrier 17.

In order to ensure a form-fit connection between anvil 15 and anvil carrier 17 which resists the axial forces F which are exerted in connection plane 35 and are caused by the longitudinal vibrations of sonotrode 14, mounting surface 21 is provided with such a surface that $R_z/R_a$ equals 4, i.e., average maximum height of profile $R_z$ is four times average roughness $R_a$.

Figure 4:
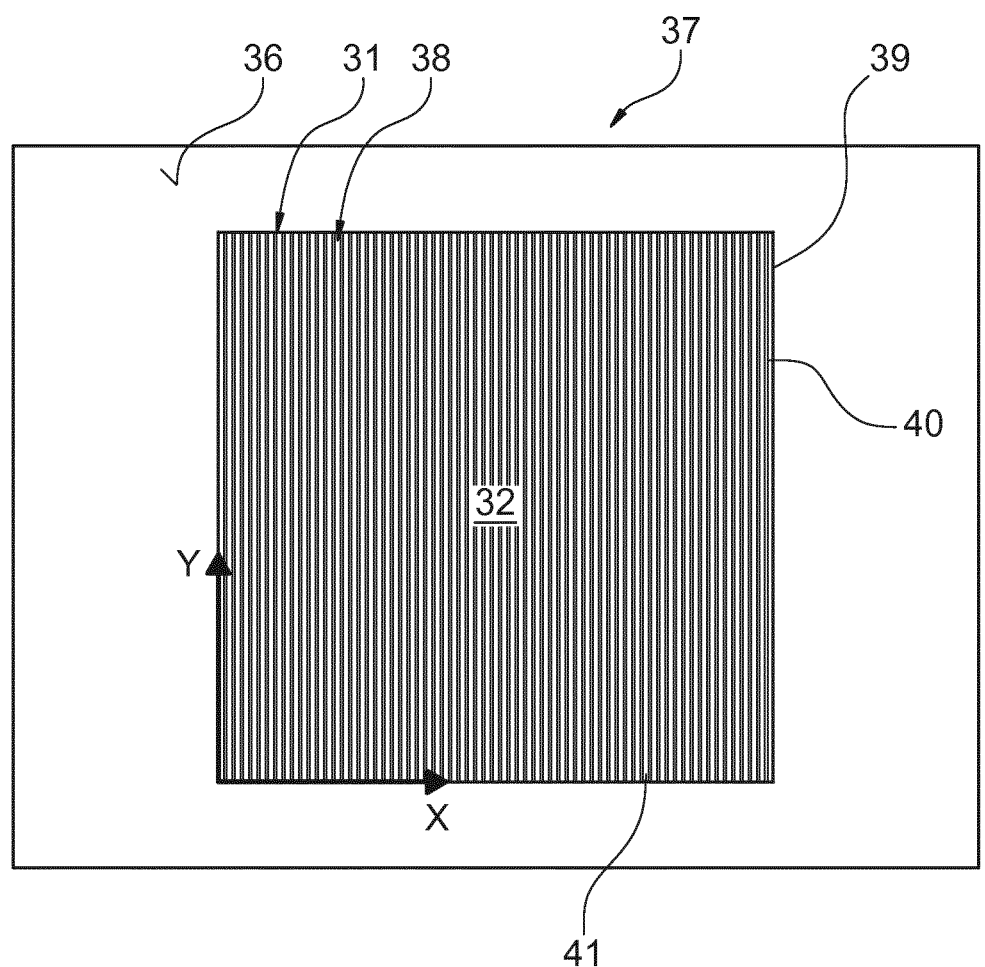
FIG. 4 shows an exemplary embodiment of the mounting surface having a surface structure realized in a partial surface of the mounting surface as a line grid.

FIG. 4 shows a depiction of an mounting surface 36 of an anvil 37 having a partial surface 38 realized therein which has a line grid 39 produced in the area of partial surface 38 by means of subjecting mounting surface 36 to laser beams. In the shown exemplary embodiment, mounting surface 36 which is produced by milling is subjected to laser beams for this purpose in the area of partial surface 38 in such a manner that material is abraded to form grooves 41 by having the laser move along parallel paths in order to form a line grid 39 having grid lines 40 running in the direction of the y axis via the subjection to laser beams.

A surface scan performed in direction x has yielded an average roughness $R_a$=6.3 μm in the area of grooves 41 and an average maximum height of the profile $R_z$=25 μm in the area of grid lines 40.

The invention claimed is:

1. An ultrasonic welding device (10) comprising a sonotrode (14) transmitting ultrasonic vibrations and an anvil (15, 37) disposed on an anvil carrier (17), the anvil (15, 37) being disposed on the anvil carrier (17) in an exchangeable manner so that an mounting surface (21, 36) of the anvil (15, 37) rests against a support surface (22) of the anvil carrier (17) by means of a normal force exerted by a pretensioning device, characterized in that the mounting surface (21, 36) of the anvil (15, 37) has a surface hardness greater than the surface hardness of the support surface (22) of the anvil carrier (17), the mounting surface (21, 36) comprising a surface structure (32) at least in the area of a partial surface (31, 38), and the mounting surface (21, 36) having a surface roughness of $R_z/R_a \geq 2$ at least in the area of the partial surface (31, 38).

2. The ultrasonic welding device according to claim 1, characterized in that the surface structure (32) comprises a linear structure component (33) inclined at least in sections at an angle of attack α with respect to the longitudinal direction (28) of the sonotrode (14).

3. The ultrasonic welding device according to claim 1, characterized in that the support surface (22) of the anvil carrier (17) has a surface hardness less than 58 HRC, and the mounting surface (21, 36) of the anvil (15, 37) has a surface hardness greater than 59 HRC.

4. The ultrasonic welding device according to any one of the claim 1, characterized in that the surface structure is formed by a line grid (39).

5. The ultrasonic welding device according to claim 4, characterized in that at least in sections, the line grid (39) has raised grid lines (40) of a maximum height determined by $R_z$.

6. The ultrasonic welding device according to claim 4, characterized in that the line grid (39) is produced by subjecting at least a partial surface (38) of the mounting surface to laser beams.

7. The ultrasonic welding device according to claim 1, characterized in that the mounting surface (21, 36) has a surface roughness of $R_z/R_a \geq 5$ at least in the area of the partial surface (31, 38).

8. The ultrasonic welding device according to claim 1, characterized in that $R_z$ is $\geq 8$ µm.

9. The ultrasonic welding device according to claim 7, characterized in that $R_z$ is $\geq 20$ µm.

10. The ultrasonic welding device according to claim 8, characterized in that $R_z$ is $\geq 25$ µm.

* * * * *